US008467893B2

(12) United States Patent
Grancharov et al.

(10) Patent No.: US 8,467,893 B2
(45) Date of Patent: Jun. 18, 2013

(54) OBJECTIVE MEASUREMENT OF AUDIO QUALITY

(75) Inventors: Volodya Grancharov, Solna (SE); Susanna Malm, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 328 days.

(21) Appl. No.: 12/812,839

(22) PCT Filed: Apr. 9, 2008

(86) PCT No.: PCT/EP2008/054300
§ 371 (c)(1),
(2), (4) Date: Jul. 14, 2010

(87) PCT Pub. No.: WO2009/089922
PCT Pub. Date: Jul. 23, 2009

(65) Prior Publication Data

US 2011/0119039 A1 May 19, 2011

Related U.S. Application Data

(60) Provisional application No. 61/006,438, filed on Jan. 14, 2008.

(51) Int. Cl.
*G06F 17/00* (2006.01)

(52) U.S. Cl.
USPC .......... 700/94

(58) Field of Classification Search
USPC .......... 700/94; 381/56, 58; 704/500–504
See application file for complete search history.

(56) References Cited

PUBLICATIONS

Malm, S. "Objective Measure for Speech Quality Estimation." Uppsala University, Jan. 24, 2008, Sections 5.2-5.3.

International Telecommunication Union. ITU-T P.862 (Feb. 2001), Series P: Telephone Transmission Quality, Telephone Installations, Local Line Networks, Methods for Objective and Subjective Assessment of Quality, Perceptual Evaluation of Speech Quality (PESQ): An Objective Method for End-to-End Speech Quality Assessment of Narrow-Band Telephone Networks and Speech Codecs. Feb. 2001.

International Telecommunication Union. "Method for Objective Measurements of Perceived Audio Quality." Recommendation ITU-R BS:1387-1, Jan. 1, 2001.

*Primary Examiner* — Andrew C Flanders
(74) *Attorney, Agent, or Firm* — Coats & Bennett, P.L.L.C.

(57) ABSTRACT

In an apparatus for objective perceptual evaluation of speech quality, parameters BandwidthRef and BandwidthTest representing the bandwidth are forwarded to a calculator 30 for calculating the relative bandwidth difference ΔBW between a reference signal and a test signal. ΔBW is forwarded to a calculator 32, which determines the value of a weighting parameter α. Preferably a sealing unit 33 scales or normalizes the disturbance density D and the asymmetric disturbance density DA, for example to the range [0,1]. The values of ΔBW and α are forwarded to a bandwidth compensator 34, which also receives the preferably scaled disturbance density D and asymmetric disturbance density DA. The bandwidth compensated disturbance densities D*, DA* are forwarded to a linear combiner 42, which forms a score representing predicted quality of the test signal.

18 Claims, 6 Drawing Sheets

OBJECTIVE MEASUREMENT OF AUDIO QUALITY

TECHNICAL FIELD

The present invention relates generally to objective measurement of audio quality.

BACKGROUND

PEAQ is an ITU-R standard for objective measurement of audio quality, see [1]. This is a method that reads an original and a processed audio waveform and outputs an estimate of perceived overall quality.

PEAQ performance is limited by its inability to assess the quality of signals with large differences in bandwidth. Furthermore, PEAQ demonstrates poor performance when evaluated on unknown data, as it is dependent on neural network weights, trained on the limited database.

PESQ is an ITU-T standard for objective measurement of audio (speech) quality, see [2]. PESQ performance is also limited by its inability to assess the quality of signals with large differences in bandwidth.

SUMMARY

An object of the present invention is to enhance performance for objective perceptual evaluation of audio quality.

This object is achieved in accordance with the attached patent claims.

Briefly, the present invention involves objective perceptual evaluation of audio quality based on one or several model output variables, and includes bandwidth compensation of at least one such model output variable.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following description elements performing the same or similar functions will be denoted by the same reference designations.

Figure 1:
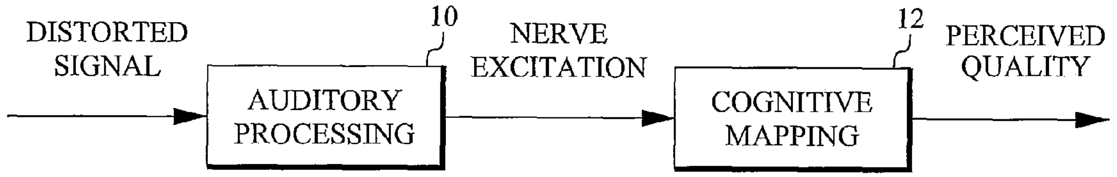
FIG. 1 is a block diagram illustrating the human hearing and quality assessment process.

The present invention relates generally to psychoacoustic methods that mimic the auditory perception to assess signal quality. The human process of assessing signal quality can be divided into two main steps, namely auditory processing and cognitive mapping, as illustrated in FIG. 1. An auditory processing block 10 contains the part where the actual sound is being transformed into nerve excitations. This process includes the Bark scale frequency mapping and the conversion from signal power to perceived loudness. A cognitive mapping block 12, which is connected to the auditory processing block 10, is where the brain extracts the most important features of the signal and assesses the overall quality.

Figure 2:
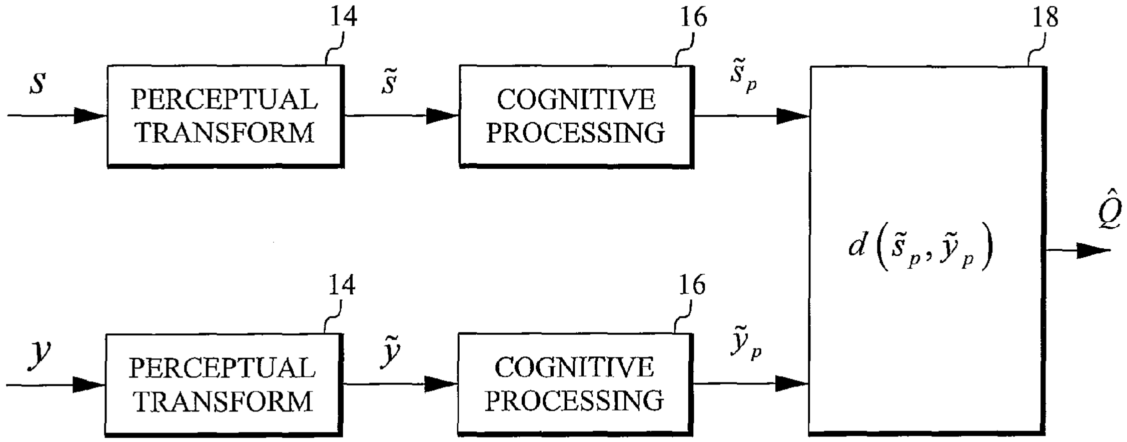
FIG. 2 is a block diagram illustrating speech quality assessment that mimics the human quality assessment process.

An objective quality assessment procedure contains both a perceptual transform and a cognitive processing to mimic the human perception, as shown in FIG. 2. The perceptual transform 14 mimics the auditory processing and is performed on both the original signal s and the distorted signal y. The output is a measure of the sound representation sent to the brain. The process includes transforming the signal power to loudness according to a nonlinear, known scale and the transformation from Hertz to Bark scale. The ear's sensitivity depends on the frequency and thresholds of audible sound are calculated. Masking effects are also taken into consideration in this step. From this perceptual transform an internal representation is calculated, which is intended to mimic the information sent to the brain. In the cognitive processing block 16 features (indicated by $\tilde{s}_p$ and $\tilde{y}_p$ respectively) that are expected to describe the signal are selected. Finally the distance $d(\tilde{s}_p,\tilde{p}_p)$ between the clean and the distorted signal is calculated in block 18. This distance yields a quality score $\hat{Q}$.

PEAQ runs in two modes: 1) Basic and 2) Advanced. For simplicity we discuss only the Basic version and refer to it as PEAQ, but the concepts are applicable also to the Advanced version.

As a first step PEAQ transforms the input signal in a perceptual domain by modeling the properties of human auditory systems. Next the algorithms extracts 11 parameters, called Model Output Variables (MOVs). In the final stage the MOVs are mapped to a single quality grade by means of an artificial neural network with one hidden layer. The MOVs are given in Table 1 below. Columns 1 and 2 give their name and description, while columns 3 and 4 introduce a notation that will be used in the description of the proposed modification.

TABLE 1

| Model Output Variable (MOV) | Description | Notation - MOV | Notation - MOV Group |
|---|---|---|---|
| WinModDiff1 | Windowed modulation difference | $F_1$ | $G_1$ |
| AvgModDiff1 | Averaged modulation difference 1 | $F_2$ | |
| AvgModDiff2 | Averaged modulation difference 2 | $F_3$ | |
| TotalNMR | Noise-to-mask ratio | $F_4$ | $G_2$ |
| RelDistFrames | Frequency of audible distortions | $F_5$ | |
| MFPD | Detection probability | $F_6$ | $G_3$ |
| ADB | Average distorted block | $F_7$ | |

TABLE 1-continued

| Model Output Variable (MOV) | Description | Notation - MOV | Notation - MOV Group |
|---|---|---|---|
| EHS | Harmonic structure of the error | $F_8$ | $G_4$ |
| RmsNoiseLoud | Root-mean square of the noise loudness | $F_9$ | $G_5$ |
| BandwidthRef | Bandwidth of the original signal | | |
| BandwidthTest | Bandwidth of the processed signal | | |

Figure 3:
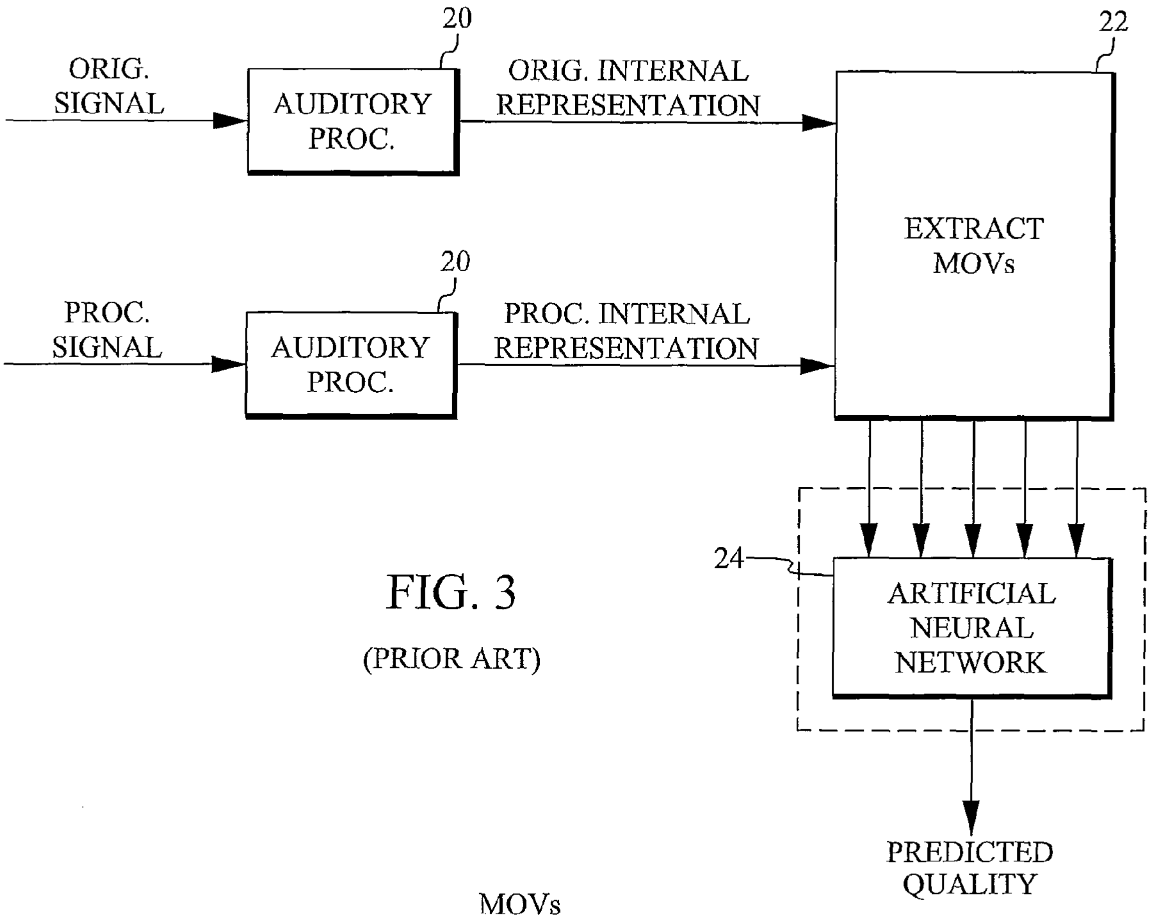
FIG. 3 (PRIOR ART)
FIG. 3 is a block diagram of an apparatus for performing the original PEAQ method.

FIG. 3 is a block diagram of an apparatus for performing the original PEAQ method. The original and processed (altered) signal are forwarded to respective auditory processing blocks 20, which transform them into respective internal representations. The internal representations are forwarded to an extraction block 22, which extracts the MOVs, which in turn are forwarded to an artificial neural network 24 that predicts the quality of the processed input signal.

Figure 4:
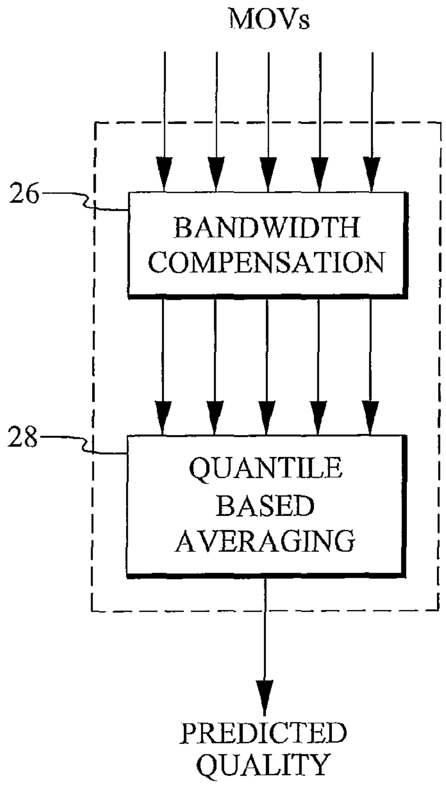
FIG. 4 is a block diagram of an example of a modification in accordance with the present invention of the apparatus in FIG. 1.

FIG. 4 is a block diagram of an example of a modification in accordance with the present invention of the apparatus in FIG. 1.

The basic concept of this embodiment is to replace the neural network of the original PEAQ (dashed box in FIG. 3) with bandwidth compensation+quantile-based averaging modules (dashed box in FIG. 4 including blocks 26 and 28). The proposed scheme is based on the same perceptual transform and MOVs extraction as the original PEAQ.

A basic aspect of the present invention is to explicitly account for (in block 26 in FIG. 4) the fact that with large differences in the bandwidth of the original and processed signal, a majority of the MOVs produce unreliable results. Thus, according to this aspect the present invention compensates for differences in bandwidth between the reference signal and the test (also called processed) signal.

Another aspect of the present invention is to avoid mapping trained on a database (in this case an artificial neural network with 42 parameters). This type of mapping may lead to unreliable results when used with an unknown/new type of data. The proposed mapping (quantile-based averaging, block 28 in FIG. 4) has no training parameters.

In the following we will refer to the proposed modification as PEAQ-E (PEAQ Enhanced). PEAQ-E is based on the same MOVs as PEAQ, but preferably scaled to the range [0,1] (other scaling or normalizing ranges are of course also feasible). Instead of feeding a neural network, as is done in PEAQ, these MOVs are preferably input to a two-stage procedure that includes bandwidth compensation and quantile-based averaging, see FIG. 4. The bandwidth compensation removes the main non-linear dependences between MOVs, and allows for use of a simpler mapping scheme (quantile-based averaging instead of a trained neural network).

The bandwidth compensation transforms each MOV $F_i$ into a new MOV $F^*_i$ (see Table 1 for notation clarification) in accordance with $$F_i^* = (1-\alpha)F_i + \alpha\Delta BW \tag{1}$$

where $$\Delta BW = \frac{\|BandwidthRef - BandwidthTest\|}{BandwidthRef} \tag{2}$$

and

-continued $$\alpha = \sqrt{\Delta BW} \tag{3}$$

and where ||.|| denotes the absolute value in (2). Here BandwidthRef represents a measure of the bandwidth of the original signal and BandwidthTest represents a measure of the bandwidth of the processed signal.

Although equation (3) gives α as the square root of ΔBW, other compressing functions of ΔBW are also feasible, for example $$\alpha = \Delta BW^{0.4}$$

$$\alpha = \Delta BW^{0.6}$$

$$\alpha = \log(\Delta BW) \tag{4}$$

After this bandwidth compensation, the new bandwidth compensated MOVs $F^*_i$ may be used to train the neural network in PEAQ. However, an alternative is to use the quantile based averaging procedure described below.

Quantile-based averaging in accordance with an embodiment of the present invention is a multi-step procedure. First the bandwidth compensated MOVs $F^*_i$ of the same type are grouped into five groups (see Table 1 for group definition), and a characteristic value $G_1 \ldots G_5$ is assigned to each group in accordance with:

$$G_1 = \frac{1}{3}(F_1^* + F_2^* + F_3^*) \tag{5}$$

$$G_2 = \frac{1}{2}(F_4^* + F_5^*) \tag{6}$$

$$G_3 = \frac{1}{2}(F_6^* + F_7^*) \tag{7}$$

$$G_4 = F_8^* \tag{8}$$

$$G_5 = F_9^* \tag{9}$$

These characteristic values represent different aspects of the signals, namely:

$G_2$—a measure of the difference of temporal envelopes of the original and processed signal.

$G_2$—a measure of the ratio of the noise to the masking threshold.

$G_3$—a measure of the probability of detecting differences between the original and processed signal.

$G_4$—a measure of the strength of the harmonic structure of the error signal.

$G_5$—a measure of the partial loudness of distortion.

Once the five characteristic values $G_1 \ldots G_5$ have been formed, these values are sorted, and min and max levels are removed, i.e.

$$\{G_j\}_{j=1}^{5} = \text{sort}(\{G_k\}_{k=1}^{5}) \tag{10}$$

Next the mean of the remaining subset $\{G_j\}_{j=2}^{4}$ is calculated, which is the output of PEAQ-E, i.e.

$$ODG = \frac{1}{3}(G_2 + G_3 + G_4) \tag{11}$$

where ODG=Objective Difference Grade.

In equations (5), (6), (7) and (11) the averages may be replaced by weighted averages.

Figure 5:
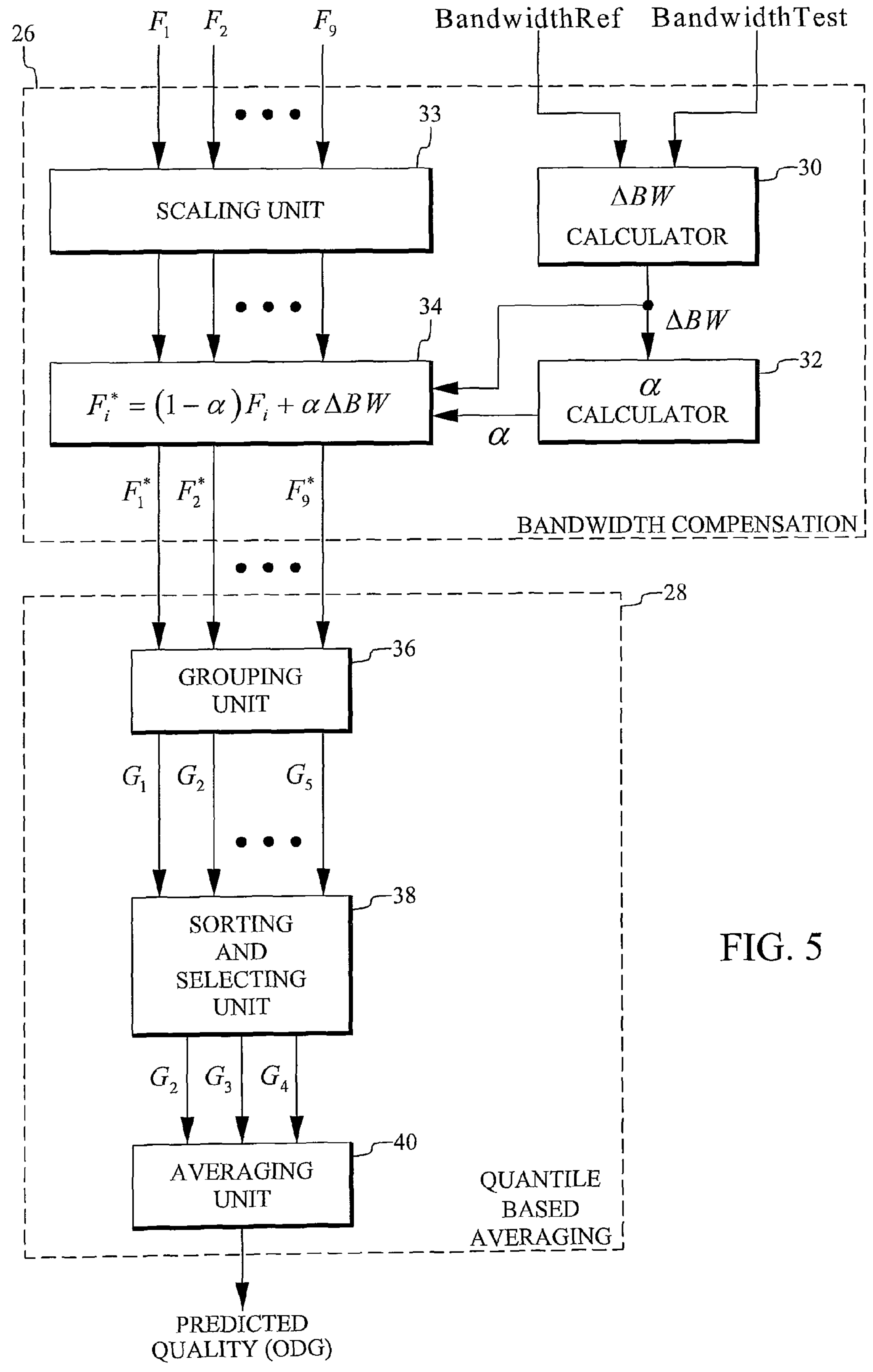
FIG. 5 is a block diagram of a preferred embodiment of a part of an apparatus for objective perceptual evaluation of audio quality in accordance with the present invention.

FIG. 5 is a block diagram of a preferred embodiment of a part of an apparatus for objective perceptual evaluation of audio quality in accordance with the present invention. The parameters BandwidthRef and BandwidthTest are forwarded to a ΔBW calculator 30, and the calculated relative bandwidth difference ΔBW is forwarded to an α calculator 32, which determines the value of α in accordance with, for example, one of the formulas given in (3) or (4) above. Preferably a scaling unit 33 scales or normalizes the model output variables $F_i$, for example to the range [0,1]. The values of ΔBW and α are forwarded to a bandwidth compensator 34, which also receives the preferably scaled variables $F_i$. In this embodiment the bandwidth compensation is performed in accordance with (1) above.

Considering the examples given in (3) and (4), it is appreciated that a may be regarded as a function of ΔBW, i.e. α=α(ΔBW). One possibility is to let α be a step function $$\alpha = \begin{cases} 0, \text{ if } \Delta BW < \Theta \\ 1, \text{ if } \Delta BW \geq \Theta \end{cases} \quad (12)$$

where Θ is a threshold. In this case (1) reduces to $$F_i^* = \begin{cases} F_i, \text{ if } \Delta BW < \Theta \\ \Delta BW, \text{ if } \Delta BW \geq \Theta \end{cases} \quad (13)$$

A further generalization of (1) is given by $$F^*_i = \beta(\Delta BW)F_i + \alpha(\Delta BW)\Delta BW \quad (14)$$

where β(ΔBW) is another function of ΔBW.

In general ΔBW is a measure of the distance between BandwidthRef and BandwidthTest. Thus, with a different mapping other measures than (2) are also possible. One example is $$\Delta BW = (\text{BandwidthRef} - \text{BandwidthTest})^2 \quad (15)$$

Returning now to FIG. 5, the bandwidth compensated model output variables $F^*_i$ may be forwarded to the trained artificial network, as in the original PEAQ standard. However, in the preferred embodiment illustrated in FIG. 5, the variables $F^*_i$ are forwarded to a grouping unit 36, which groups them into different groups and calculates a characteristic value for each group, as described with reference to (5)-(9) above. These characteristic values $G_k$ are forwarded to a sorting and selecting unit 38, which sorts them and removes the min and max values. The remaining characteristic values $G_2$, $G_3$, $G_4$ are forwarded to an averaging unit 40, which forms a measure representing the predicted quality in accordance with (11)

Figure 6:
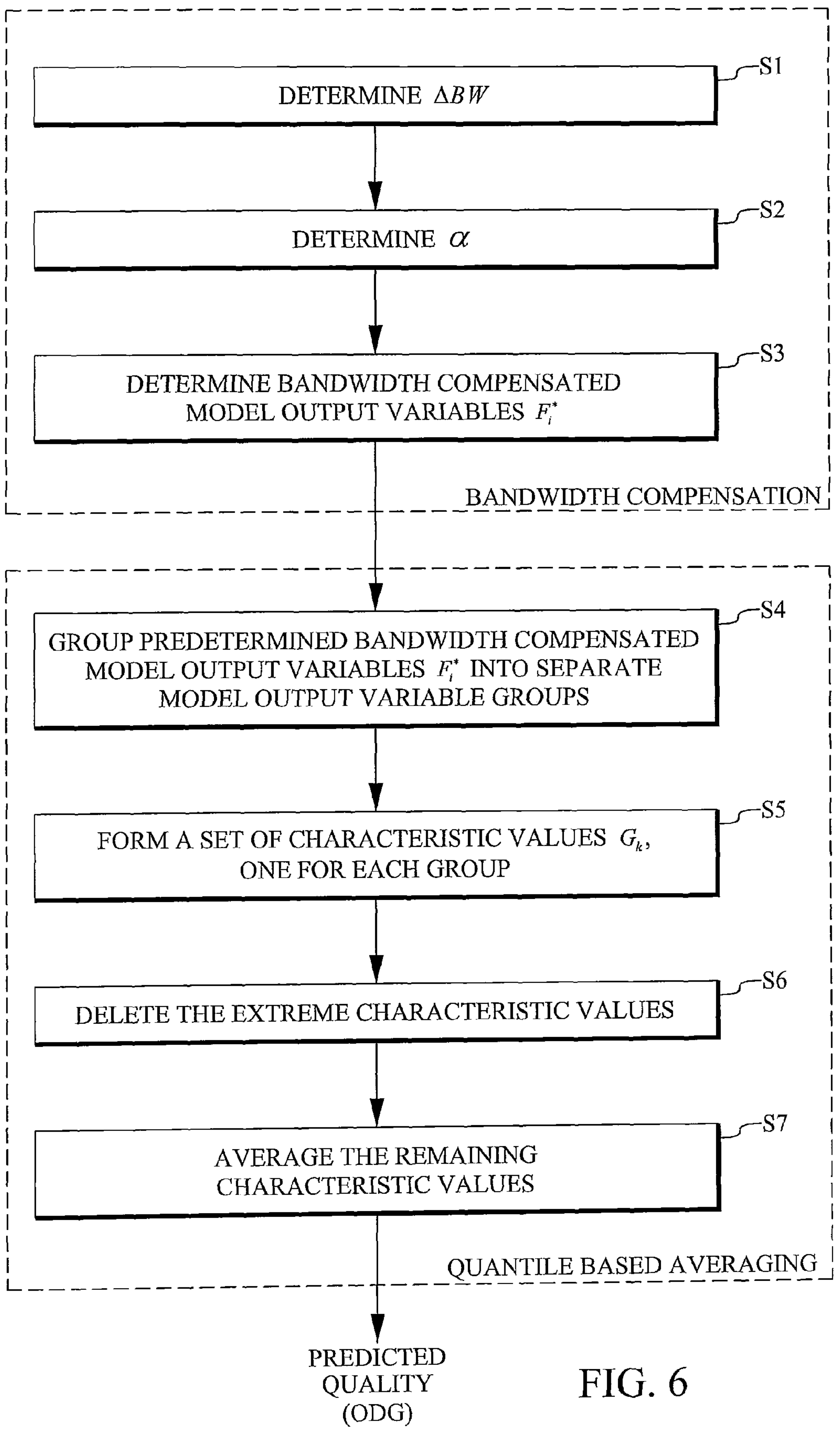
FIG. 6 is a flow chart of a preferred embodiment of a part of a method of objective perceptual evaluation of audio quality in accordance with the present invention.

FIG. 6 is a flow chart of a preferred embodiment of a part of a method of objective perceptual evaluation of audio quality in accordance with the present invention. Step S1 determines ΔBW as described above. Step S2 determines α as described above. Step S3 determines the bandwidth compensated model output variables $F^*_i$ using the preferably scaled model output variables $F_i$, as described above. These compensated variables may be forwarded to the trained artificial neural network. However, in the preferred embodiment they are instead forwarded to the quantile based averaging procedure, which starts in step S4. Step S4 groups the bandwidth compensated model output variables $F^*_i$ into separate model output variable groups. Step S5 forms a set of characteristic values $G_k$ (described with reference to (5)-(9)), one for each group. Step S6 deletes the extreme (Max and MM) characteristic values. Finally step S7 forms the predicted quality (ODG) by averaging the remaining characteristic values.

The present invention has several advantages over the original PEAQ, some of which are:

- PEAQ-E has higher prediction accuracy. Over a set of databases PEAQ-E has significantly higher correlation with subjective quality R=0.85, compared to R=0.68 for PEAQ (see Table 2). Even without quantile based averaging, i.e. with only bandwidth compensation, R is of the order of 0.80.
- The preferred embodiment of PEAQ-E with quantile based averaging is more robust than PEAQ. The worst correlation for a single database for PEAQ-E is R=0.70, while for PEAQ it is R=0.45 (see Table 2).
- The preferred embodiment of PEAQ-E with quantile based averaging generalizes better for unknown data, as it has no training parameters, while PEAQ has 42 database trained weights for the artificial neural network.

Table 2 below gives the correlation coefficient over 14 subjective databases for the original and enhanced PEAQ. All databases are based on MUSHRA methodology, see [3]. As each group corresponds to one type of distortion, this operation ignores the contribution of types of distortions that are not consistent with the majority.

TABLE 2

| R (PEAQ) | R (PEAQ-E) | Test description | # test items |
|---|---|---|---|
| 0.6607 | 0.7339 | stereo, mixed content, 24 kHz | 72 |
| 0.7385 | 0.7038 | stereo, mixed content, 48 kHz | 60 |
| 0.924 | 0.9357 | stereo, mixed content, 48 kHz | 80 |
| 0.6422 | 0.8447 | stereo, mixed content, 48 kHz | 108 |
| 0.4852 | 0.9238 | stereo, mixed content, 48 kHz | 108 |
| 0.5618 | 0.9192 | mono, mixed content, 48 kHz | 72 |
| 0.9213 | 0.9284 | mono, speech, 8 kHz | 70 |
| 0.9041 | 0.9225 | mono, speech, 8 kHz | 70 |
| 0.709 | 0.826 | mono, speech, 24/32/48 kHz | 99 |
| 0.6271 | 0.912 | mono, speech, 48 kHz | 96 |
| 0.7174 | 0.7778 | mono/stereo, music, 44.1 kHz | 239 |
| 0.452 | 0.8381 | stereo, speech, 44.1 kHz | 90 |
| 0.5719 | 0.9229 | stereo, mixed content, 32 kHz | 48 |
| 0.6376 | 0.7352 | stereo, mixed content, 16 kHz | 72 |
| 0.68 | 0.85 | | |

The concept of bandwidth compensation described above may also be used in other procedures for perceptual evaluation of audio quality. An example is the PESQ (Perceptual Evaluation of Speech Quality) standard, see [2]. In this standard the speech quality is predicted from a feature called "disturbance density", which will be denoted D below. This feature is conceptually very close to "RmsNoiseLoud" ($F_9$ in Table 1) in PEAQ.

The PESQ standard may be summarized as follows. First, in a preprocessing step, the original and processed signals are time and level aligned. Next, for both signals, the power spectrum is calculated, on 32 ms frames with 50% overlap. The perceptual transform is performed by mean of conversion to a Bark scale followed by conversion to loudness densities. Finally the signed difference between the loudness densities of the original and processed signals gives two parameters (model output variables), the disturbance density D and asymmetric disturbance density DA. These two parameters are aggregated over frequency and time to obtain average disturbance densities, which are mapped by means of the sigmoid function to the objective quality.

In PESQ the bandwidth can, for example, be calculated in the following way (this description follows the procedure in which the bandwidth is calculated in PEAQ standard):

1. Perform an FFT on the reference signal. Select 1/10 of the frequency bins with largest numbers (that is if your frequency bins are numbered 1 to 100, select bins with numbers 91, 92, 93, . . . , 100). Define a threshold level T as the max energy in the selected group of frequency bins. When searching backwards (from high to low frequency bin numbers, in our example from 90, 89 to 1), define BandwidthRef as the first frequency bin that has an energy that exceeds the threshold level T by 10 dB.
2. For the test signal use the threshold level, as calculated from the reference signal (that is, use the same T). Again in the FFT domain define BandwidthTest as the frequency bin that has an energy that exceeds the threshold level T by 10 dB.

To summarize: BandwidthRef and BandwidthTest are just FFT bin numbers of the bins that have an energy that exceeds a certain threshold. This threshold is calculated as the max energy among the FFT bins with highest numbers. After determining BandwidthRef and BandwidthTest the bandwidth compensation of the (preferably scaled) disturbance density D may be performed in the same way as discussed in connection with equations (1)-(3) above. This gives $$D^* = (1-\alpha)D + \alpha\Delta BW \quad (16)$$

where $$\Delta BW = \frac{\|BandwidthRef - BandwidthTest\|}{BandwidthRef} \quad (17)$$

and $$\alpha = \sqrt{\Delta BW} \quad (18)$$

and where ||.|| denotes the absolute value in (17). Other compressing functions of ΔBW are also feasible for α, see the discussion for PEAQ above.

The corresponding bandwidth compensation for the (preferably scaled) asymmetric disturbance density DA is $$DA^* = (1-\alpha)DA + \alpha\Delta BW \quad (19)$$

Considering the examples given in (3) and (4) (or (18)), it is appreciated that α may be regarded as a function of ΔBW, i.e. α=α(ΔBW). One possibility is to let α be a step function $$\alpha = \begin{cases} 0, \text{ if } \Delta BW < \Theta \\ 1, \text{ if } \Delta BW \geq \Theta \end{cases} \quad (20)$$

where Θ is a threshold. In this case (16) and (19) reduce to $$D = \begin{cases} D, \text{ if } \Delta BW < \Theta \\ \Delta BW, \text{ if } \Delta BW \geq \Theta \end{cases} \quad (21)$$

$$DA = \begin{cases} DA, \text{ if } \Delta BW < \Theta \\ \Delta BW, \text{ if } \Delta BW \geq \Theta \end{cases} \quad (22)$$

A further generalization of (16) and (19) is given by $$D^* = \beta(\Delta BW)D + \alpha(\Delta BW)\Delta BW \quad (23)$$

$$DA^* = \beta(\Delta BW)DA + \alpha(\Delta BW)\Delta BW \quad (24)$$

where β(ΔBW) is another function of ΔBW

In general ΔBW is a measure of the distance between BandwidthRef and BandwidthTest. Thus, with a different mapping other measures than (17) are also possible. One example is $$\Delta BW = (\text{BandwidthRef} - \text{BandwidthTest})^2 \quad (25)$$

Figure 7:
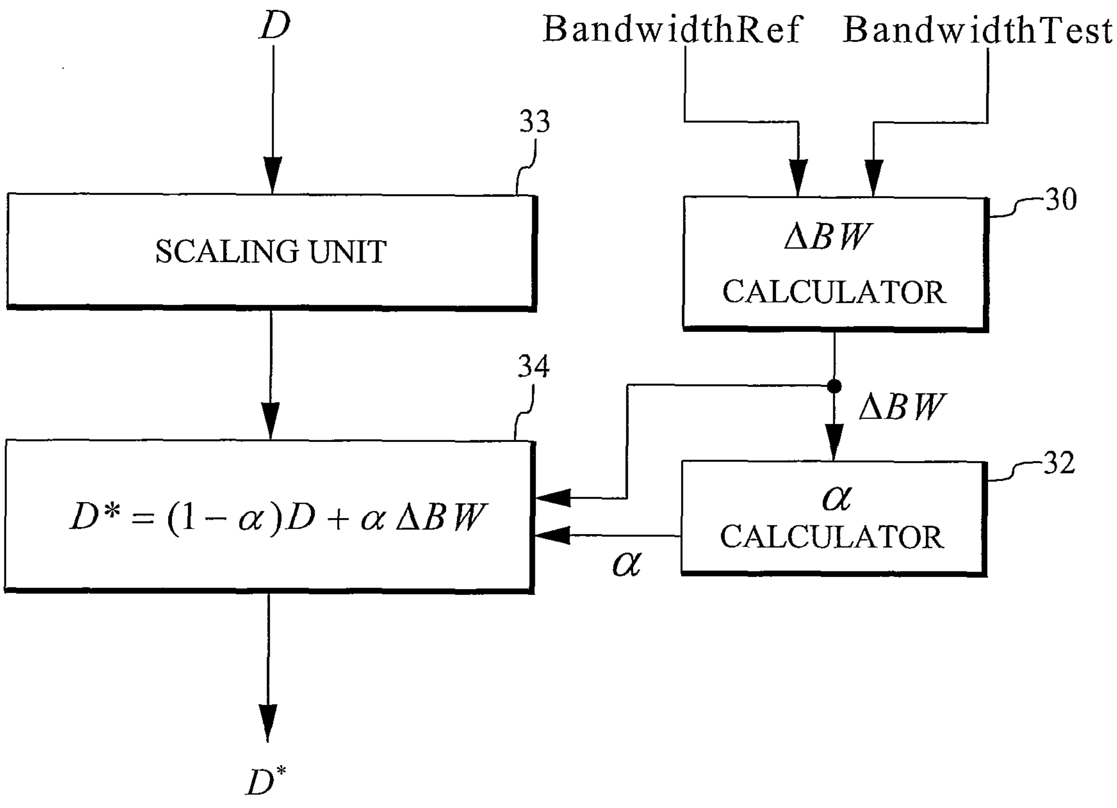
FIG. 7 is a block diagram of an embodiment of a part of an apparatus for objective perceptual evaluation of speech quality in accordance with the present invention.

FIG. 7 is a block diagram of an embodiment of a part of an apparatus for objective perceptual evaluation of speech quality in accordance with the present invention. The parameters BandwidthRef and BandwidthTest are forwarded to ΔBW calculator 30, and the calculated relative bandwidth difference ΔBW is forwarded to α calculator 32, which determines the value of α in accordance with, for example, one of the formulas given in (18) or (4) above. Preferably a scaling unit 33 scales or normalizes the disturbance density D, for example to the range [0,1]. The values of ΔBW and α are forwarded to a bandwidth compensator 34, which also receives the preferably scaled disturbance density D. In this embodiment the bandwidth compensation is performed in accordance with (16) above.

Figure 8:
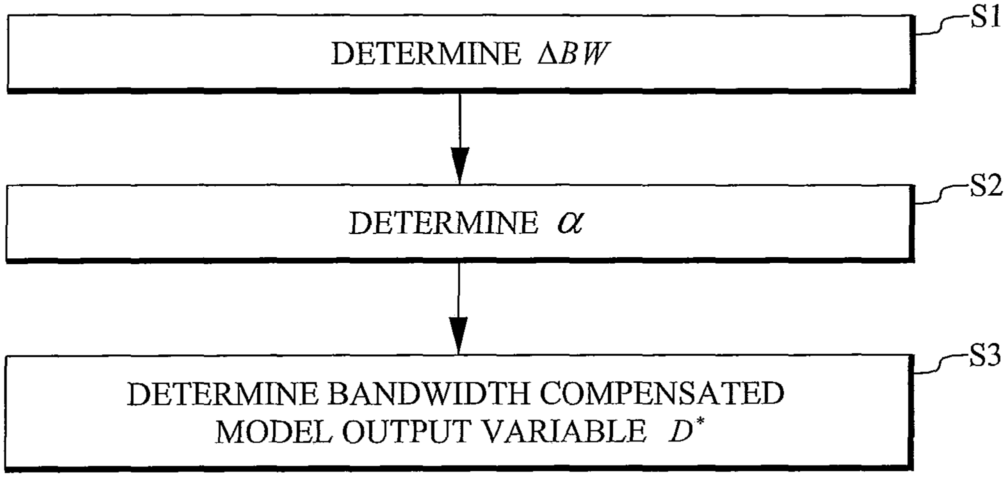
FIG. 8 is a flow chart of an embodiment of a part of a method of objective perceptual evaluation of speech quality in accordance with the present invention.

FIG. 8 is a flow chart of an embodiment of a part of a method of objective perceptual evaluation of speech quality in accordance with the present invention. Step S1 determines ΔBW as described above. Step S2 determines α as described above. Step S3 determines the bandwidth compensated disturbance density D* using the preferably scaled disturbance density D, as described above.

Figure 9:
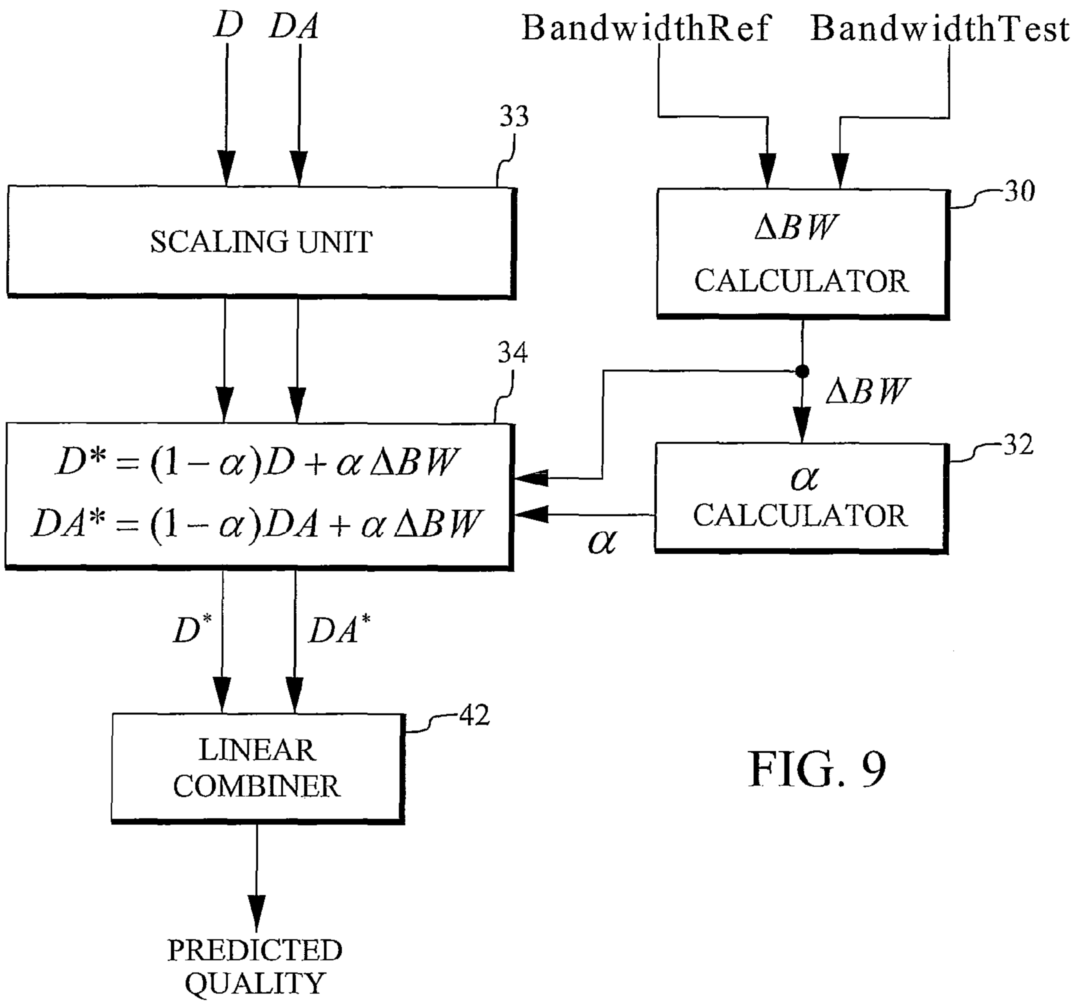
FIG. 9 is a block diagram of a preferred embodiment of a part of an apparatus for objective perceptual evaluation of speech quality in accordance with the present invention.

FIG. 9 is a block diagram of a preferred embodiment of a part of an apparatus for objective perceptual evaluation of speech quality in accordance with the present invention. The parameters BandwidthRef and BandwidthTest are forwarded to ΔBW calculator 30, and the calculated relative bandwidth difference ΔBW is forwarded to a calculator 32, which determines the value of α in accordance with, for example, one of the formulas given in (18) or (4) above. Preferably a scaling unit 33 scales or normalizes the disturbance density D and the asymmetric disturbance density DA, for example to the range [0,1]. The values of ΔBW and α are forwarded to a bandwidth compensator 34, which also receives the preferably scaled disturbance density D and asymmetric disturbance density DA. In this embodiment the bandwidth compensation is performed in accordance with (16) and (19) above. The bandwidth compensated disturbance densities D*, DA* are forwarded to a linear combiner 42, which forms the PESQ score representing predicted quality.

Figure 10:
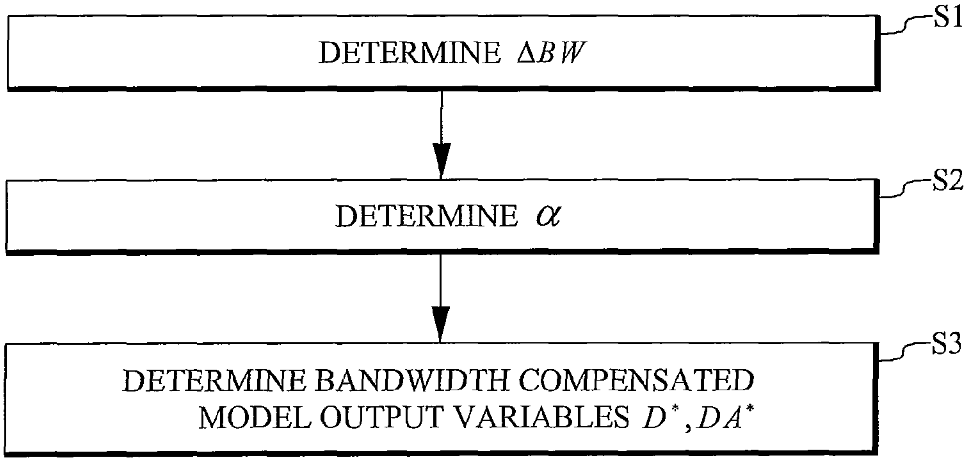
FIG. 10 is a flow chart of a preferred embodiment of a part of a method of objective perceptual evaluation of speech quality in accordance with the present invention.

FIG. 10 is a flow chart of a preferred embodiment of a part of a method of objective perceptual evaluation of speech quality in accordance with the present invention. Step S1 determines ΔBW as described above. Step S2 determines α as described above. Step S3 determines the bandwidth compensated disturbance density D* and asymmetric disturbance density DA* using the preferably scaled disturbance density D and asymmetric disturbance density DA, as described above.

The functionality of the various blocks and steps is typically implemented by one or several micro processors or micro/signal processor combinations and corresponding software.

It will be understood by those skilled in the art that various modifications and changes may be made to the present invention without departure from the scope thereof, which is defined by the appended claims.

ABBREVIATIONS

| | |
|---|---|
| PEAQ | Perceptual Evaluation of Audio Quality |
| PESQ | Perceptual Evaluation of Speech Quality |

-continued

| ABBREVIATIONS | |
|---|---|
| PEAQ-E | PEAQ Enhanced (the proposed modification) |
| MOV | Model Output Variable |
| MUSHRA | MUlti Stimulus test with Hidden Reference and Anchor |
| ODG | Objective Difference Grade |

REFERENCES

[1] ITU-R Recommendation BS.1387-1, Method for objective measurements of perceived audio quality, 2001.

[2] ITU-T Recommendation P.862, Methods for objective and subjective assessment of quality, 2001

[3] ITU-R Recommendation BS.1534, Method for the subjective assessment of intermediate quality level of coding systems, 2001

The invention claimed is:

1. A method of objective perceptual evaluation of audio quality based on at least one model output variable comprising:

bandwidth compensating the at least one model output variable for differences in bandwidth between an original signal and a processed signal by applying a function to the at least one model output variable, the function being a linear combination of the at least one model output variable and a function of the difference between a measure of the bandwidth of the original signal and a measure of the bandwidth of the processed signal;

wherein the coefficients of the linear combination are functions of the difference; and wherein the bandwidth compensating the at least one model output variable includes bandwidth compensating at least one of the model output variables $F_i$ of the Perceptual Evaluation of Audio Quality (PEAQ) standard, to obtain the corresponding bandwidth compensated model output variable $F^*_i$ where:

$F_1$=WinModDiff1;

$F_2$=AvgModDiff1;

$F_3$=AvgModDiff2;

$F_4$=TotalNMR;

$F_5$=RelDistFrames;

$F_6$=MFPD;

$F_7$=ADB;

$F_8$=EHS; and $F_9$=RmsNoiseLoud; and wherein the bandwidth compensation is performed in accordance with:

$$F_i^* = (1-\alpha)F_i + \alpha\Delta BW$$

where $$\Delta BW = \frac{\|BandwidthRef - BandwidthTest\|}{BandwidthRef}$$

where $\|.\|$ denotes the absolute value;

BandwidthRef is the measure of the bandwidth of the original signal;

BandwidthTest is the measure of the bandwidth of the processed signal;

$\alpha$ is a compressing function of $\Delta$BW; and $F^*_i$ denotes the bandwidth compensated version of $F_i$.

2. The method of claim 1, wherein all model output variables $F_1$-$F_9$ are bandwidth compensated, to obtain bandwidth compensated model output variables denoted as $F^*_1$-$F^*_9$.

3. The method of claim 1, wherein $\alpha=\sqrt{\Delta BW}$.

4. A method of objective perceptual evaluation of audio quality based on at least one model output variable, the method comprising:

bandwidth compensating the at least one model output variable for differences in bandwidth between an original signal and a processed signal by applying a function to the at least one model output variable, the function being a linear combination of the at least one model output variable and a function of the difference between a measure of the bandwidth of the original signal and a measure of the bandwidth of the processed signal;

wherein the coefficients of the linear combination are functions of the difference; and wherein the bandwidth compensating the at least one model output variable includes bandwidth compensating at least one of the model output variables $F_i$ of the Perceptual Evaluation of Audio Quality (PEAQ) standard, to obtain the corresponding bandwidth compensated model output variable $F^*_i$, where:

$F_1$=WinModDiff1;

$F_2$=AvgModDiff1;

$F_3$=AvgModDiff2;

$F_4$=TotalNMR;

$F_5$=RelDistFrames;

$F_6$=MFPD;

$F_7$=ADB;

$F_8$=EHS; and $F_9$=RmsNoiseLoud; and wherein the method further comprises:

grouping predetermined bandwidth compensated model output variables $F^*_i$ into separate model output variable groups;

forming a set of characteristic values $G_k$, one for each of the groups;

deleting the maximum and minimum characteristic values; and averaging the remaining characteristic values.

5. The method of claim 4, further comprising scaling the model output variables $F_i$ to a predetermined interval.

6. The method of claim 5, wherein the model output variables $F_i$ are scaled to the interval [0, 1].

7. A method of objective perceptual evaluation of audio quality based on at least one model output variable, the method comprising:

bandwidth compensating the at least one model output variable for differences in bandwidth between an original signal and a processed signal by applying a function to the at least one model output variable, the function being a linear combination of the at least one model output variable and a function of the difference between a measure of the bandwidth of the original signal and a measure of the bandwidth of the processed signal, wherein the coefficients of the linear combination are functions of the difference; and bandwidth compensating the disturbance density D of the Perceptual Evaluation of Speech Quality (PESQ) standard, to obtain the bandwidth compensated disturbance density;

wherein the bandwidth compensation is performed in accordance with:

$$D^* = (1-\alpha)D + \alpha\Delta BW$$

where $$\Delta BW = \frac{\|BandwidthRef - BandwidthTest\|}{BandwidthRef}$$

where $\|.\|$ denotes the absolute value;

BandwidthRef is the measure of the bandwidth of the original signal;

BandwidthTest is the measure of the bandwidth of the processed signal; and $\alpha$ is a compressing function of $\Delta BW$.

8. A method of objective perceptual evaluation of audio quality based on at least one model output variable, the method comprising:

bandwidth compensating the at least one model output variable for differences in bandwidth between an original signal and a processed signal by applying a function to the at least one model output variable, the function being a linear combination of the at least one model output variable and a function of the difference between a measure of the bandwidth of the original signal and a measure of the bandwidth of the processed signal, wherein the coefficients of the linear combination are functions of the difference; and bandwidth compensating the asymmetric disturbance density DA of the Perceptual Evaluation of Speech Quality (PESQ) standard, to obtain a bandwidth compensated asymmetric disturbance density DA*;

wherein the bandwidth compensation is performed in accordance with:

$$DA^* = (1-\alpha)DA + \alpha\Delta BW$$

where $$\Delta BW = \frac{\|BandwidthRef - BandwidthTest\|}{BandwidthRef}$$

where $\|.\|$ denotes the absolute value;

BandwidthRef is the measure of the bandwidth of the original signal;

BandwidthTest is the measure of the bandwidth of the processed signal; and $\alpha$ is a compressing function of $\Delta BW$.

9. The method of claim 8, wherein $\alpha=\sqrt{\Delta BW}$.

10. An apparatus for objective perceptual evaluation of audio quality based on at least one model output variable, the method comprising:

one or more processing circuits configured to bandwidth compensate the at least one model output variable for differences in bandwidth between an original signal and a processed signal by applying a function to the at least one model output variable, the function being a linear combination of the at least one model output variable and a function of the difference between a measure of the bandwidth of the original signal and a measure of the bandwidth of the processed signal;

wherein the coefficients of the linear combination are functions of the difference; and wherein to bandwidth compensate at least one model output variable, the one or more processing circuits are configured to bandwidth compensate at least one of the model output variables $F_i$ of the Perceptual Evaluation of Audio Quality (PEAQ) standard, to obtain the corresponding bandwidth compensated model output variable $F^*_i$, and where:

$F_1$=WinModDiff1;

$F_2$=AvgModDiff1;

$F_3$=AvgModDiff2;

$F_4$=TotalNMR;

$F_5$=RelDistFrames;

$F_6$=MFPD;

$F_7$=ADB;

$F_8$=EHS; and $F_9$=RmsNoiseLoud; and wherein the one or more processing circuits are configured to bandwidth compensate the model output variables $F_i$ in accordance with:

$$F_i^* = (1-\alpha)F_i + \alpha\Delta BW$$

where $$\Delta BW = \frac{\|BandwidthRef - BandwidthTest\|}{BandwidthRef}$$

where $\|.\|$ denotes the absolute value;

BandwidthRef is the measure of the bandwidth of the original signal;

BandwidthTest is the measure of the bandwidth of the processed signal;

$\alpha$ is a compressing function of $\Delta BW$; and $F^*_i$ denotes the bandwidth compensated version of $F_i$.

11. The apparatus of claim 10, wherein the apparatus is configured to bandwidth compensate all model output variables $F_1$-$F_9$, to obtain bandwidth compensated model output variables $F^*_1$-$F^*_9$.

12. The apparatus of claim 10, wherein $\alpha=\sqrt{\Delta BW}$.

13. An apparatus for objective perceptual evaluation of audio quality based on at least one model output variable, the apparatus comprising:

one or more processing circuits configured to bandwidth compensate the at least one model output variable for differences in bandwidth between an original signal and a processed signal by applying a function to the at least one model output variable, the function being a linear combination of the at least one model output variable and a function of the difference between a measure of the bandwidth of the original signal and a measure of the bandwidth of the processed signal;

wherein the coefficients of the linear combination are functions of the difference; and wherein to bandwidth compensate at least one model output variable, the one or more processing circuits are configured to bandwidth compensate at least one of the model output variables $F_i$ of the Perceptual Evaluation of Audio Quality (PEAQ) standard, to obtain the corresponding bandwidth compensated model output variable $F^*_i$, and where:

$F_1$=WinModDiff1;

$F_2$=AvgModDiff1;

$F_3$=AvgModDiff2;

$F_4$=TotalNMR;

$F_5$=RelDistFrames;

$F_6$=MFPD;

$F_7$=ADB;

$F_8$=EHS; and $F_9$=RmsNoiseLoud;

wherein the one or more processing circuits include:

a grouping unit adapted to group predetermined bandwidth compensated model output variables $F^*_i$ into separate model output variable groups and to form a set of characteristic values $G_k$, one for each of the groups;

a sorting and selecting unit adapted to delete the maximum and minimum characteristic values; and an averaging unit adapted to average the remaining characteristic values.

14. The apparatus of claim 13, wherein the one or more processing circuits include a scaling unit adapted to scale the model output variables $F_i$ to a predetermined interval.

15. The apparatus of claim 14, wherein the scaling unit is adapted to scale the model output variables $F_i$ to the interval [0, 1].

16. An apparatus for objective perceptual evaluation of audio quality based on at least one model output variable, the apparatus comprising:

one or more processing circuits configured to bandwidth compensate the at least one model output variable for differences in bandwidth between an original signal and a processed signal by applying a function to the at least one model output variable, the function being a linear combination of the at least one model output variable and a function of the difference between a measure of the bandwidth of the original signal and a measure of the bandwidth of the processed signal;

wherein the coefficients of the linear combination are functions of the difference; and wherein to bandwidth compensate the at least one model output variable, the one or more processing circuits are configured to bandwidth compensate the disturbance density D of the Perceptual Evaluation of Speech Quality (PESQ) standard, to obtain a bandwidth compensated disturbance density D*;

wherein the one or more processing circuits are configured to bandwidth compensate the disturbance density D in accordance with:

$$D^* = (1-\alpha)D + \alpha\Delta BW$$

where $$\Delta BW = \frac{\|BandwidthRef - BandwidthTest\|}{BandwidthRef}$$

where

||.|| denotes the absolute value;

BandwidthRef is the measure of the bandwidth of the original signal;

BandwidthTest is the measure of the bandwidth of the processed signal; and

α is a compressing function of ΔBW.

17. An apparatus for objective perceptual evaluation of audio quality based on at least one model output variable, the apparatus comprising:

one or more processing circuits configured to bandwidth compensate the at least one model output variable for differences in bandwidth between an original signal and a processed signal by applying a function to the at least one model output variable, the function being a linear combination of the at least one model output variable and a function of the difference between a measure of the bandwidth of the original signal and a measure of the bandwidth of the processed signal;

wherein the coefficients of the linear combination are functions of the difference; and wherein to bandwidth compensate the at least one model output variable, the one or more processing circuits are configured to bandwidth compensate the disturbance density D of the Perceptual Evaluation of Speech Quality (PESQ) standard, to obtain a bandwidth compensated disturbance density D*;

wherein the one or more processing circuits are configured to bandwidth compensate the asymmetric disturbance density DA in accordance with:

$$DA^* = (1-\alpha)DA + \alpha\Delta BW$$

where $$\Delta BW = \frac{\|BandwidthRef - BandwidthTest\|}{BandwidthRef}$$

where

||.|| denotes the absolute value;

BandwidthRef is the measure of the bandwidth of the original signal;

BandwidthTest is the measure of the bandwidth of the processed signal; and

α is a compressing function of ΔBW.

18. The apparatus of claim 17, wherein $\alpha=\sqrt{\Delta BW}$.

* * * * *

UNITED STATES PATENT AND TRADEMARK OFFICE

CERTIFICATE OF CORRECTION

PATENT NO. : 8,467,893 B2
APPLICATION NO. : 12/812839
DATED : June 18, 2013
INVENTOR(S) : Grancharov et al.

It is certified that error appears in the above-identified patent and that said Letters Patent is hereby corrected as shown below:

On the Title Page, in Item (57), under “ABSTRACT”, in Column 2, Line 7, delete “sealing unit 33” and insert -- scaling unit 33 --, therefor.

In the Specification

In Column 2, Line 36, delete “$\tilde{y}_p$” and insert -- $\tilde{y}_p$, --, therefor.

In Column 2, Line 37, delete “$\tilde{p}_p$)” and insert -- $\tilde{y}_p$), --, therefor.

In Column 5, Line 52, delete “with (11)” and insert -- with (11). --, therefor.

In Column 5, Line 67, delete “MM)” and insert -- Min) --, therefor.

In Column 7, Line 65, delete “ΔBW” and insert -- ΔBW. --, therefor.

Signed and Sealed this
Eighteenth Day of February, 2014

Michelle K. Lee

Michelle K. Lee
*Deputy Director of the United States Patent and Trademark Office*